(12) United States Patent
Joshi et al.

(10) Patent No.: US 11,962,596 B2
(45) Date of Patent: Apr. 16, 2024

(54) INTEGRATED MULTIFACTOR AUTHENTICATION FOR NETWORK ACCESS CONTROL

(71) Applicant: Bank of America Corporation, Charlotte, NC (US)

(72) Inventors: Shardul Vasudev Joshi, Frisco, TX (US); Abhishek Palahalli Manjunath, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 247 days.

(21) Appl. No.: 17/393,531

(22) Filed: Aug. 4, 2021

(65) Prior Publication Data

US 2023/0043757 A1    Feb. 9, 2023

(51) Int. Cl.
*H04L 9/40* (2022.01)

(52) U.S. Cl.
CPC ........ *H04L 63/102* (2013.01); *H04L 63/0272* (2013.01); *H04L 63/0823* (2013.01)

(58) Field of Classification Search
CPC .............. H04L 63/102; H04L 63/0272; H04L 63/0823; H04L 9/3263; G06F 21/33; H04W 12/069
See application file for complete search history.

(56) References Cited

U.S. PATENT DOCUMENTS

| | | | |
|---|---|---|---|
| 8,504,831 B2 | 8/2013 | Pratt et al. | |
| 8,831,563 B2 * | 9/2014 | Martell | H04W 4/02 455/418 |
| 9,276,929 B2 | 3/2016 | Williams et al. | |
| 9,350,717 B1 | 5/2016 | Siddiqui | |
| 9,355,231 B2 | 5/2016 | Disraeli | |
| 9,374,369 B2 | 6/2016 | Mahaffey et al. | |

(Continued)

FOREIGN PATENT DOCUMENTS

| | | |
|---|---|---|
| WO | 2015130700 A1 | 9/2015 |
| WO | 2019191417 A1 | 10/2019 |
| WO | 2019191427 A1 | 10/2019 |

OTHER PUBLICATIONS

T.Venkat et al., Authentication Using Mobile Phone as a Security Token, Oct. 2011, pp. 569-574 (Year: 2011).*

(Continued)

*Primary Examiner* — Luu T Pham
*Assistant Examiner* — Canh Le

(57) ABSTRACT

A device configured to receive a connection request that includes device authentication credentials and to determine the user device passes authentication in response to identifying a device profile associated with the device authentication credentials. The device is further configured to receive user credentials for a first user and identify a first user identity that corresponds with the user credentials. The device is further configured to establish a first network connection with the user device, to send a token request to the user device, and to receive a token via the first network connection. The device is further configured to identify a second user identity based on the token, to determine the first user identifier matches the second user identifier, and to establish a second network connection for the user device, wherein the network connection enables the user device to access the network.

14 Claims, 3 Drawing Sheets

(56) References Cited

U.S. PATENT DOCUMENTS

| | | |
|---|---|---|
| 9,432,358 B2 | 8/2016 | Xia |
| 9,473,491 B1 | 10/2016 | Johansson et al. |
| 9,565,183 B2 | 2/2017 | Razack et al. |
| 9,576,119 B2 | 2/2017 | Mcgeehan et al. |
| 9,578,499 B2 | 2/2017 | Brill et al. |
| 9,686,245 B2 | 6/2017 | Brand |
| 9,774,552 B2 | 9/2017 | Shuman et al. |
| 9,864,852 B2 | 1/2018 | Johansson et al. |
| 9,887,991 B2 | 2/2018 | Allinson et al. |
| 9,992,198 B2 | 6/2018 | Bao et al. |
| 10,084,780 B2 | 9/2018 | Bao et al. |
| 10,097,998 B2 | 10/2018 | Gupta et al. |
| 10,102,524 B2 | 10/2018 | Vridhachalam et al. |
| 10,193,880 B1 | 1/2019 | Jiang et al. |
| 10,198,417 B2 | 2/2019 | Thakker |
| 10,200,359 B1 | 2/2019 | Sokolov et al. |
| 10,235,532 B2 | 3/2019 | Scholz |
| 10,275,823 B2 | 4/2019 | Lanpher et al. |
| 10,362,026 B2 | 7/2019 | Johansson et al. |
| 10,389,731 B2 | 8/2019 | Diacetis et al. |
| 10,440,018 B2 | 10/2019 | Drake et al. |
| 10,530,768 B2 | 1/2020 | Shteingart et al. |
| 10,587,614 B2 | 3/2020 | Brown |
| 10,673,636 B1 | 6/2020 | Finke et al. |
| 10,708,776 B2 | 7/2020 | Hanley et al. |
| 10,841,297 B2 | 11/2020 | Johansson et al. |
| 10,917,400 B1 | 2/2021 | Goings |
| 11,055,395 B2 | 7/2021 | Novik et al. |
| 2006/0153346 A1 | 7/2006 | Gonen et al. |
| 2010/0024017 A1 | 1/2010 | Ashfield et al. |
| 2010/0225443 A1 | 9/2010 | Bayram et al. |
| 2011/0202466 A1 | 8/2011 | Carter |
| 2014/0189804 A1 | 7/2014 | Lehmann et al. |
| 2015/0066762 A1 | 3/2015 | Chatterton et al. |
| 2015/0078357 A1* | 3/2015 | L'Heureux ............ H04L 67/14 370/338 |
| 2015/0120562 A1 | 4/2015 | Zhang |
| 2015/0242602 A1 | 8/2015 | Skygebjerg |
| 2016/0344730 A1 | 11/2016 | Holz |
| 2018/0032750 A1 | 2/2018 | Hammel |
| 2018/0229689 A1 | 8/2018 | Brown |
| 2018/0232514 A1 | 8/2018 | Brown |
| 2018/0234418 A1 | 8/2018 | Brown |
| 2018/0262484 A1* | 9/2018 | Kesari .................... H04L 51/42 |
| 2018/0278607 A1* | 9/2018 | Loladia ............... H04L 61/4588 |
| 2018/0295126 A1* | 10/2018 | Gilpin ................ H04L 63/0853 |
| 2018/0316671 A1 | 11/2018 | Brown |
| 2021/0105264 A1* | 4/2021 | Patel .................. H04L 63/0807 |

OTHER PUBLICATIONS

Muchamad Rusdan, "Designing of User Authentication Based on Multi-factor Authentication on Wireless Networks," Dec. 2019, pp. 201-209 (Year: 2019).*

* cited by examiner

INTEGRATED MULTIFACTOR AUTHENTICATION FOR NETWORK ACCESS CONTROL

TECHNICAL FIELD

The present disclosure relates generally to information security, and more specifically to integrated multifactor authentication for network access control.

BACKGROUND

In a network environment, devices are in data communication with other devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as user devices, databases, and servers, are vulnerable to attacks. This vulnerability poses several network security challenges. Existing systems are typically unable to detect a network attack until after the attack has occurred. For example, a bad actor may upload malicious files to a device which then allows the bad actor to gain unauthorized access to other files or documents that are also stored in the device. Having a delayed response allows the bad actor to gain access to sensitive information within the network and allows bad actors to perform other malicious activities such as data exfiltration or uploading malware.

SUMMARY

The disclosed system provides several practical applications and technical advantages that overcome the previously discussed technical problems. For example, the disclosed system provides a practical application by providing a process that allows a device to implement an integrated multifactor authentication process to authenticate a user and their user device before allowing the user to establish a connection with a network. Conventional multifactor authentication typically uses a single authentication technique that is based on a combination of information that is provided by a user. For example, this process may involve authenticating a user based on a combination of user inputs. These existing multifactor authentication techniques are unable to detect a bad actor when the bad actor is able to obtain valid authentication credentials for a user. In contrast, the disclosed process uses a combination of independent authentication techniques to authenticate a user and their user device. Each authentication technique authenticates a user based on information that is provided by the user and then outputs a user identity that identifies the user that is associated with the provided information. The information system is configured to repeat this process using multiple independent authentication techniques. The information system then compares the obtained user identities from each authentication technique to each other to determine whether all of the user identities correspond with the same user.

This process provides a technical advantage because a bad actor will need to pass multiple independent authentication processes in order to gain access to the network. Even if a bad actor is able to obtain valid credentials to pass authentication, the information system can detect malicious activity when there is a mismatch between the user identities that are obtained from the different authentication techniques. When the user identities all correspond with the same user, the information system will establish a network connection between the user's user device and the network. After establishing the network connection, the user may access the network and its resources (e.g. data, software resources, and hardware resources). This process provides increased information security by ensuring that both a user and their user device have been authenticated before allowing the user to access the network and its resources. This process also provides information security by preventing a bad actor from gaining access to the network and its resources to perform malicious activities.

Improving information security for the system also improves the underlying network and the devices within the network. For example, when a data exfiltration attack occurs, there is an increase in the number of network resources and bandwidth that are consumed which reduces the throughput of the network. By preventing data exfiltration attacks, the system can prevent any unnecessary increases in the number of network resources and bandwidth that are consumed that would otherwise negatively impact the throughput of the system. As another example, when a malware attack occurs, one or more devices may be taken out of service until the malware can be removed from the devices. Taking devices out of service negatively impacts the performance and throughput of the network because the network has fewer resources for processing and communicating data. By preventing malware types of attacks, the system prevents any comprised devices from being taken out of service due to an attack that would otherwise negatively impact the performance and throughput of the network.

In one embodiment, the information system comprises a device that is configured to receive a connection request that comprises device authentication credentials and to determine the user device passes authentication in response to identifying a device profile associated with the device authentication credentials. The device is further configured to receive user credentials for a first user and identify a first user identity that corresponds with the user credentials. The device is further configured to establish a first network connection with the user device, to send a token request to the user device, and to receive a token via the first network connection. The device is further configured to identify a second user identity based on the token, to determine the first user identifier matches the second user identifier, and to establish a second network connection for the user device, wherein the network connection enables the user device to access the network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
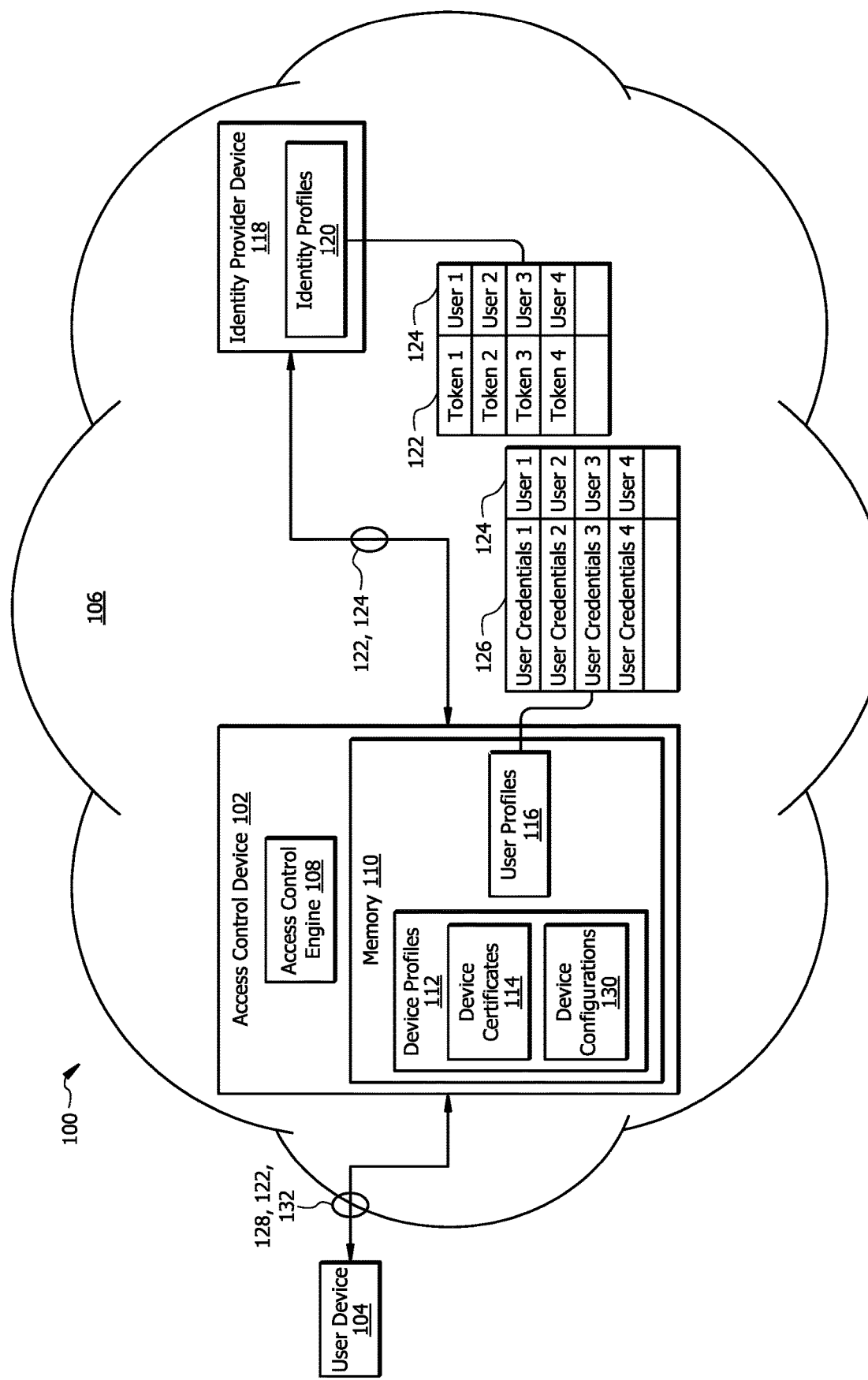
FIG. 1 is a schematic diagram of an embodiment of an information system that is configured to employ integrated multifactor authentication for accessing a network.

FIG. 1 is a schematic diagram of an embodiment of an information system 100 that is configured to employ integrated multifactor authentication for accessing a network 106. The information system 100 is generally configured to implement the integrated multifactor authentication process to authenticate a user and their user device 104 before allowing the user to establish a connection with the network 106. This process involves having a user and a user device 104 authenticate themselves using multiple independent authentication techniques. Each authentication technique is configured to authenticate a user based on information that is provided by the user and to output a user identity 124 that identifies the user based on the information that was provided. For example, the user may provide user credentials 126 (e.g. a username and password). In this example, the information system 100 authenticates the user based on the user credentials 126. After authenticating the user, the information system 100 then determines a user identity 124 that is associated with the provided user credentials 126. The information system 100 is configured to repeat this process using multiple other independent authentication techniques. The information system 100 is further configured to compare the obtained user identities 124 to each other to determine whether all of the user identities 124 correspond with the same user. When the user identities 124 all correspond with the same user, the information system 100 will establish a network connection between the user's user device 104 and the network 106. After establishing the network connection, the user may access the network 106 and its resources (e.g. data, software resources, and hardware resources). This process provides increased information security by ensuring that both a user and their user device 104 have been authenticated before allowing the user to access the network 106 and its resources. This process provides information by preventing a bad actor from gaining access to the network 106 and its resources to perform malicious activities.

In one embodiment, the information system 100 comprises one or more user devices 104, an access control device 102, and an identity provider device 118 that are in signal communication with each other. The access control device 102 may also be in signal communication with other network devices within the network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 106 may be configured to support any suitable type of communication protocol as would be appreciated by one of ordinary skill in the art.

User Devices

Examples of user devices 104 include, but are not limited to, a smartphone, a tablet, a laptop, a computer, a smart device, or any other suitable type of device. The user device 104 is generally configured to provide hardware and software resources to a user. The user device 104 comprises a graphical user interface (e.g. a display or a touchscreen) that allows a user to view information on the user device 104. The user device 104 also comprises a touchscreen, a touchpad, keys, buttons, a mouse, or any other suitable type of user interface that allows a user to provide inputs into the user device 104. The user device 104 is further configured to send a connection request 128 to the access control device 102 to request access to the network 106 for a user. The user device 104 may also be configured to send user credentials 126, tokens 122, or any other suitable type of information to the access control device 102 to authenticate the user and the user device 104.

Identity Provider Device

Examples of an identity provider device 118 include, but are not limited to, a server, an access point, a computer, or any other suitable type of network device. The identity provider device 118 is a hardware device that is configured to receive a token 122 for a user, to validate the token 122, and to output a user identity 124 for the user that is associated with the token 122. A token 122 is an authentication token or code that is provided by a user to validate their identity. Each token 122 has a unique value that is associated with a particular user. The identity provider device 118 may be configured to employ any suitable authentication technique or protocol for validating tokens 122. The identity provider device 118 comprises identity profiles 120 that are stored in a memory device. The identity profile 120 is configured to map tokens 122 to user identities 124. In FIG. 1, the identity provider device 118 is shown as a separate device from the access control device 102. In some embodiments, the identity provider device 118 may be integrated with the access control device 102. In this configuration, the access control device 102 may be configured to perform the operations that are associated with the identity provider device 118.

Access Control Device

Examples of an access control device 102 include, but are not limited to, a server, an access point, a computer, or any other suitable type of network device. In one embodiment, an access control device 102 comprises an access control engine 108 and a memory 110. Additional details about the hardware configuration of the access control device 102 are described in FIG. 3. The memory 110 is configured to store device profiles 112, user profiles 116, and/or any other suitable type of data.

In one embodiment, the access control engine 108 is generally configured to use integrated multifactor authentication to authenticate a user and their user device 104 before allowing the user device 104 to connect to the network 106. This process involves authenticating a user using a first authentication technique to determine a first user identity and then authenticating the user using a second authentication technique to determine a second user identity. Each of the authentication technique are independent of each other and rely on different types of inputs to authenticate a user. The access control device 102 allows the user device 104 to connect to the network 106 when the first user identity matches the second user identity. This process provides information security by requiring a user to pass multiple independent authentication techniques to verify their identity before their user device 104 is allows to connect to the network 106.

The device profiles 112 generally comprises information that is associated with known and approved user devices 104 for accessing the network 106. The device profiles may comprise device certificates 114, device configurations 130, user information, user permission settings, or any other suitable type of information that is associated with a user device 104. A device configuration 130 identifies the hardware configuration and/or the software configuration of a user device 104. The device certificate 114 comprises information that identifies a user device 104. Each user device 104 is uniquely associated with a device certificate 114.

The user profiles 116 generally comprises information that is associated with known and approved users for accessing the network 106. The user profiles 116 may comprise user identities 124, user credentials 126, account information, contact information, user device information, user permission settings, or any other suitable type of information that is associated with users. Examples of user identities 124 include, but are not limited to, a name, an alphanumeric code, an employee number, an account number, a phone number, an email address, or any other suitable type of identifier that is uniquely associated with a user. Examples of user credentials 126 include, but are not limited to, log-in credentials, a username and password, a token, a Personal Identification Number (PIN), an alphameric value, biometric information, or any other suitable type of information that can be used to verify the identity of a user.

Integrated Multifactor Authentication Process for Connecting to a Network

Figure 2:
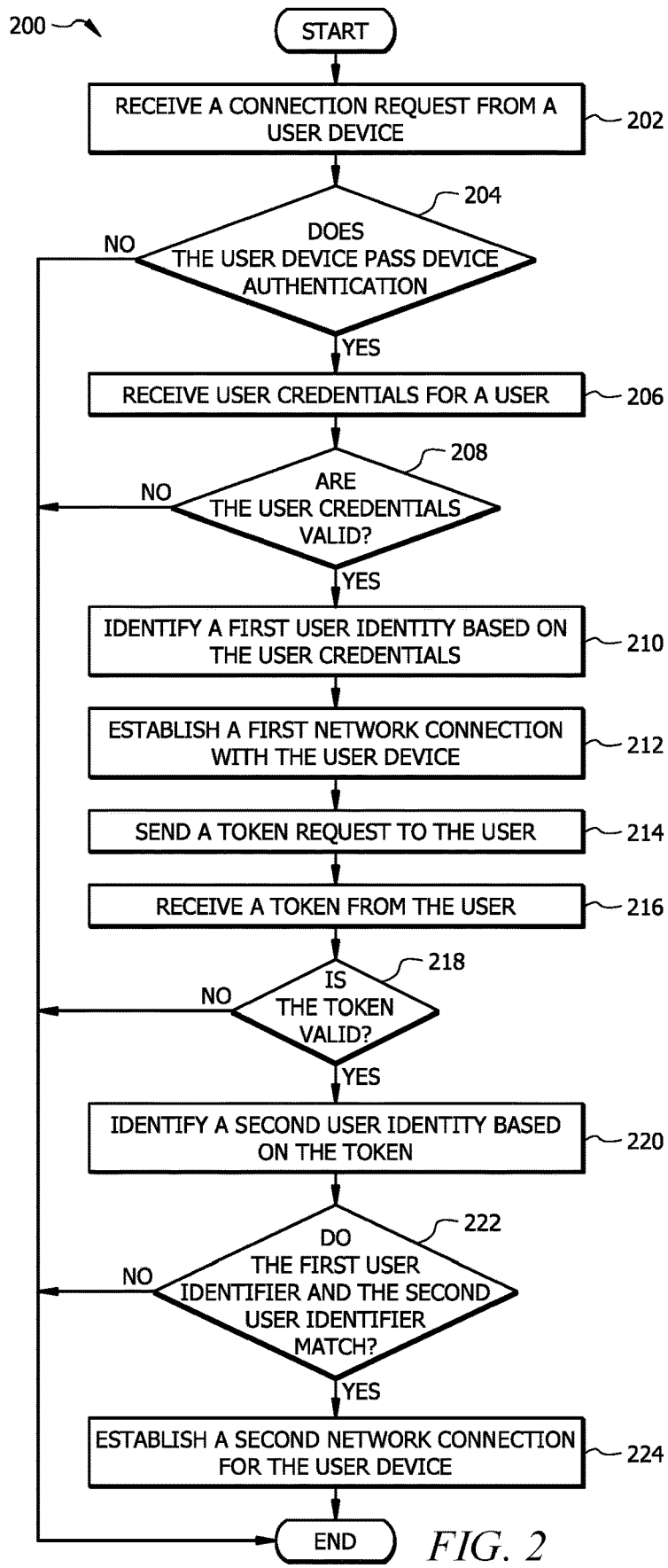
FIG. 2 is a flowchart of an embodiment of an integrated multifactor authentication process for the information system.

FIG. 2 is a flowchart of an embodiment of an integrated multifactor authentication process 200 for the information system 100. The information system 100 may employ process 200 to implement an integrated multifactor authentication process to authenticate a user and their user device 104 before allowing the user to establish a connection with the network 106. This process provides increased information security by ensuring that both a user and their user device 104 have been authenticated before allowing the user to access the network 106 and its resources.

At step 202, the access control device 102 receives a connection request 128 from a user device 104. The connection request 128 is a request for permission to connect the user device 104 to the network 106. The connection request 128 comprises information that identifies the user device 104 and/or device authentication credentials for the user device 104. For example, the connection request may comprise a device certificate 114 that identifies the user device 104 that is sending the connection request 128. The user device 104 may use any suitable messaging technique or protocol to send the connection request 128 to the access control device 102.

At step 204, the access control device 102 determines whether the user device 104 passes device authentication. In one embodiment, the access control device 102 determines whether a device profile 112 exists in memory 110 for a user device 104 that corresponds with the device authentication credentials. In this example, the access control device 102 may use the device certificate 114 as a search token to determine whether a device profile 112 exists in memory 110 for the user device 104. The access control device 102 may determine that user device 104 passes device authentication when the access control device 102 is able to identify a device profile 112 for the user device 104. In some embodiments, the access control device 102 may use the device profile 112 for the user device 104 to obtain a user identity 124 for the user that is assigned to the user device 104. The access control device 102 terminates process 200 in response to determining that the user device 104 fails device authentication. In this case, the access control device 102 determines that the device certificate 114 is not associated with a known or approved user device 104 and terminates process 200 which prevents the user device 104 from accessing the network 106. The access control device 102 proceeds to step 206 in response to determining that the user device 104 passes device authentication. In this case, the access control device 102 proceeds to step 206 to identify the user that is sending the connection request 128.

At step 206, the access control device 102 receives user credentials 126 for a user that is associated with the user device 104. As an example, the user device 104 is configured to use the log-in credentials that are provided by the user to access the user device 104 as their user credentials 126. As another example, the user device 104 may be configured to prompt the user to enter their user credentials 126 into a graphical user interface on the user device 104. After obtaining the user credentials 126 from the user, the user device 104 then transmits the user credentials 126 to the access control device 102.

At step 208, the access control device 102 determines whether the user credentials 126 are valid. Here, the access control device 102 may compare the provided user credentials 126 to the user credentials 126 that are stored in the user profiles 116 to determine whether there is a match. In this example, the access control device 102 may use the user credentials 126 as a search token to determine whether a user profile 116 exists for the user. The access control device 102 determines that user credentials 126 are valid when the access control device 102 is able to identify a user profile 116 for the user. Otherwise, the access control device 102 determines that user credentials 126 are invalid when the access control device 102 is unable to identify a user profile 116 for the user. The access control device 102 terminates process 200 in response to determining that the user credentials 126 are invalid. In this case, the access control device 102 determines that the user credentials 126 are not associated with a known or approved user and terminates process 200 which prevents the user device 104 from accessing the network 106. The access control device 102 proceeds to step 210 in response to determining that the user credentials are valid. In this case, the access control device 102 determines that the user credentials 126 are associated with a known user and proceeds to step 210 to identify the user.

At step 210, the access control device 102 identifies a first user identity 124 based on the user credentials 126. Here, the access control device 102 identifies the user identity 124 that corresponds with the user credentials 126 in the identified user profile 116 for the user.

At step 212, the access control device 102 establishes a first network connection with the user device 104. As an example, the first network connection may be a tunnel connection between the user device 104 and the access control device 102. In other examples, the first network connection may be any suitable type of network connection. The first network connection enables two-way communications between the user device 104 and the access control device 102, but restricts access to the network 106 for the user device 104.

At step 214, the access control device 102 sends a token request 132 to the user device 104 via the first network connection. In one embodiment, the access control device 102 sends the token request 132 by executing code or a script that redirects a browser on the user device 104 to a predetermined webpage. The browser on the user device 104 is redirected to a webpage where the user can enter their token 122. For example, the webpage may comprise a text field that allows the user to enter an alphanumeric code or token 122.

At step 216, the access control device 102 receives a token 122 from the user via the first network connection. Continuing with the previous example, the access control device 102 may receive the token 122 from the user via the webpage that was provided in step 214. In this example, the user may use the webpage to input their token 122 and to send the token 122 to the access control device 102. In other examples, the user device 104 may use any other suitable technique to send the token 122 to the access control device 102. For example, the first network connection may be a point-to-point connection between the user device 104 and the access control device 102. In this example, the user device 104 may transmit the token 122 directly to the access control device 102.

At step 218, the access control device 102 determines whether the token 122 is valid. In one embodiment, the access control device 102 may send the token 122 to the identity provider device 118 to validate the token 122. For example, the access control device 102 may use unicast or anycast to send the token 122 to the identity provider device 118. When the identity provider device 118 is configured to receive messages from multiple access control devices 102, the access control device 102 may append an identifier that identifies the access control device 102 to any outgoing messages or requests that are sent to the identity provider device 118. The identifier may be a name, a numeric value, an alphanumeric code, or any other suitable type of identifier that is associated with the access control device 102. This process allows the identity provider device 118 to identify and respond to the correct access control device 102. The identity provider device 118 may use any suitable technique to validate the token 122. After validating the token 122, the identity provider device 118 may send a response to the access control device 102 that indicates whether the token 122 is valid. The access control device 102 terminates process 200 in response to determining that the token 122 is invalid. In this case, the access control device 102 determines that the token 122 provided by the user device 104 does not correspond with a valid user. The access control device 102 then terminates process 200 to prevent the user device 104 from accessing the network 106. The access control device 102 proceeds to step 220 in response to determining that the token 122 is valid. In this case, the access control device 102 determines that the token 122 corresponds with a valid user. The access control device 102 proceeds to step 220 to obtain a user identity 124 that corresponds with the token 122.

At step 220, the access control device 102 identifies a second user identity 124 based on the token 122. The access control device 102 may receive the second user identity 124 from the identity provider device 118. For example, after validating the token 122, the identity provider device 118 may identify the user identity 124 that corresponds with the token 122 in the identity profiles 120. The identity provider device 118 may then send the user identity 124 to the access control device 102.

At step 222, the access control device 102 determines whether the first user identity 124 matches the second user identity 124. Here, the access control device 102 compares the first user identity 124 and the second user identity 124 to determine whether they correspond with the same user. The access control device 102 terminates process 200 in response to determining that the first user identity 124 does not match the second user identity 124. In this case, the access control device 102 determines that there is a mismatch between the two user identities 124 because the user identities 124 do not correspond with the same user. In some instances, this may indicate that the user provided the wrong user credentials 126 or token 122. In other instances, this may indicate a potential bad actor that is trying to access the network 106 using someone else's user credentials 126 or token 122. In either case, the access control device 102 terminates process 200 which prevents the user device 104 from accessing the network 106.

The access control device 102 proceeds to step 224 in response to determining that the first user identity 124 matches the second user identity 124. In this case, the access control device 102 is able to confirm that the user credentials 126 and the token 122 both correspond with the same user. The access control device 102 proceeds to step 224 to connect the user device 104 to the network 106. At step 224, the access control device 102 establishes a second network connection for the user device 104. The second network connection enables the user device 104 to access the network 106. As an example, the second network connection may be a virtual private network (VPN) connection. In other examples, the second network connection may be any suitable type of network connection. After establishing the second network connection, the user device 104 can access data and resources within the network 106 and can communicate with other devices within the network 106.

In other embodiments, the access control device 102 may be configured to use any suitable number or type of authentication techniques to obtain user identities 124. In this case, the access control device 102 may employ a process similar to the process described above to verify that all of the obtained user identities 124 correspond with the same user before establishing the second network connection.

In some embodiments, the access control device 102 may determine whether the user device 104 satisfies a set of device configuration requirements before establishing the second network connection for the user device 104. For example, the access control device 102 may identify a device configuration 130 for the user device 104 from the device profile 112 that is associated with the user device 104. The device configuration 130 identifies the hardware configuration and/or the software configuration of the user device 104. The access control device 102 then compares the device configuration 130 for the user device 104 to a set of device configuration requirements. The set of device requirements identify hardware and/or software that are required for the user device 104 to connect to the network 106. For example, the set of device requirements may identify hardware types, hardware settings, firmware types, software settings, security settings, or any other suitable type of device configuration requirements. If the user device 104 does not satisfy the set of device requirements, the access control device 102 may provide instructions to remediate any identified issues. For example, the access control device 102 may output instructions that any software, firmware, and/or hardware updates that are required before the user device 104 can access the network 106. In some embodiments, the access control device 102 may wait for the user device 104 to download and update any software or firmware. In this case, the access control device 102 reanalyzes the device configuration 130 of the user device 104 to determine whether the user device 104 satisfies the set of device configuration requirements. When the user device 104 satisfies the set of device configuration requirements, the access control device 102 may proceed to establish the second network connection for the user device 104.

In some embodiments, the access control device 102 may determine whether the user is authorized to access the network 106 before establishing the second network connection for the user device. For example, the access control device 102 may identify user permission settings for the user in the user profile 116 to determine whether the user is authorized to access the network 106. The access control device 102 may not establish the second network connection in response to determining that the user is not authorized to access the network 106. Otherwise, the access control device 102 will establish the second network connection in response to determining that the user is authorized to access the network 106.

Hardware Configuration for the Access Control Device

Figure 3:
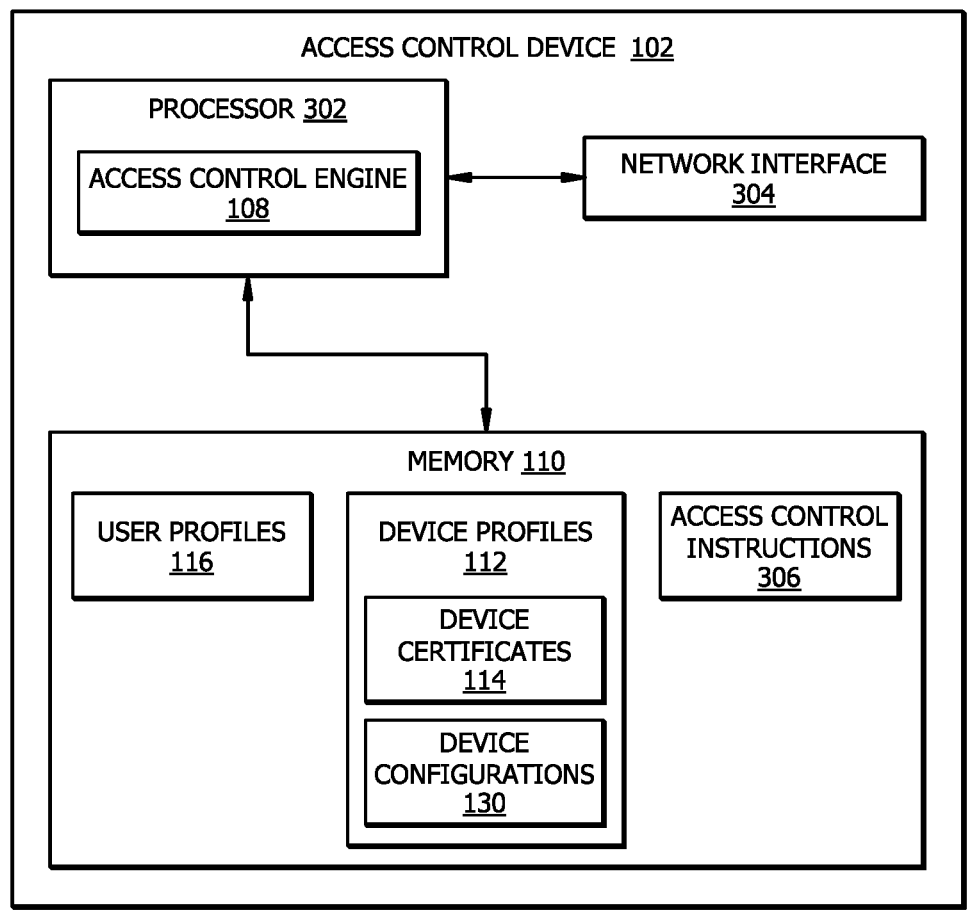
FIG. 3 is an embodiment of an access control device for a network.

FIG. 3 is an embodiment of an access control device 102 for the information system 100. As an example, the access control device 102 may be a server or a computer. The access control device 102 comprises a processor 302, a memory 110, and a network interface 304. The access control device 102 may be configured as shown or in any other suitable configuration.

Processor

The processor 302 comprises one or more processors operably coupled to the memory 110. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 110 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute access control instructions 306 to implement the access control engine 108. In this way, processor 302 may be a special-purpose computer designed to implement the functions disclosed herein. In an embodiment, the access control engine 108 is implemented using logic units, FPGAs, ASICs, DSPs, or any other suitable hardware. The access control engine 108 is configured to operate as described in FIGS. 1 and 2. For example, the access control engine 108 may be configured to perform the steps of process 200 as described in FIG. 2.

Memory

The memory 110 is a hardware device that is operable to store any of the information described above with respect to FIGS. 1 and 2 along with any other data, instructions, logic, rules, or code operable to implement the function(s) described herein when executed by the processor 302. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store access control instructions 306, device profiles 112, device certificates 114, device configurations 130, user profiles 116, and/or any other data or instructions. The access control instructions 306 may comprise any suitable set of instructions, logic, rules, or code operable to execute the access control engine 108. The device profiles 112, device certificates 114, device configurations 130, and user profiles 116 are configured similar to the device profiles 112, device certificates 114, device configurations 130, and user profiles 116 described in FIGS. 1 and 2, respectively.

Network Interface

The network interface 304 is a hardware device that is configured to enable wired and/or wireless communications. The network interface 304 is configured to communicate data between user devices 104, the identity provider device 118, and other devices, systems, or domains. For example, the network interface 304 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An access control device, comprising:
   a memory operable to store:
      device profiles identifying approved user devices for accessing a network, wherein each user device is associated with device authentication credentials; and
      user profiles identifying approved users for accessing the network, wherein each user is associated with user credentials; and
   a processor operably coupled to the memory, configured to:

receive a connection request from a user device, wherein the connection request comprises device authentication credentials for the user device;
identify a device profile for the user device that corresponds with the device authentication credentials;
determine that the user device passes authentication in response to identifying the device profile;
receive user credentials for a first user of the user device;
identify a first user identity of the first user using the user credentials for the first user;
establish a first network connection with the user device, wherein the first network restricts access to network resources;
send a token request to the user device via the first network connection, wherein the token request is sent by executing code to redirect a browser on the user device to a webpage;
receive a token from the webpage and via the first network connection in response to sending the token request to the user device, wherein the token is a unique value that is associated with the first user;
identify a second user identity of the first user obtained using the token;
determine that the first user identity of the first user matches the second user identity of the first user; and
establish a second network connection for the user device, wherein the second network connection enables the user device to access the network resources that were restricted by the first network connection, wherein identifying the second user identity of the first user obtained using the token includes:
sending the token to an identity provider device that is configured to validate the token; and
receiving the second user identity from the identity provider device after validating the token.

2. The access control device of claim 1, wherein:
the device profiles further comprise device configurations for the approved user devices; and
the processor is further configured to:
identify a device configuration that identifies a hardware configuration and a software configuration for the user device;
compare the device configuration to a set of device configuration requirements; and
determine the user device satisfies the set of device configuration requirements based on the device configuration before establishing the second network connection.

3. The access control device of claim 1, wherein the device authentication credentials comprises a device certificate that identifies the user device.

4. The access control device of claim 1, wherein:
the user profiles further comprise user permission settings for users; and
the processor is further configured to:
identify user permission settings for the first user; and
determine the first user is authorized to access the network based on the user permission settings before establishing the second network connection.

5. The access control device of claim 1, wherein the second network connection is a virtual private network (VPN) connection with the network.

6. An integrated multifactor authentication method, comprising:

receiving a connection request from a user device, wherein the connection request comprises device authentication credentials for the user device;
identifying a device profile for the user device that corresponds with the device authentication credentials;
determining that the user device passes authentication in response to identifying the device profile;
receiving user credentials for a first user of the user device;
identifying a first user identity of the first user based on the user credentials for the first user;
establishing a first network connection with the user device, wherein the first network restricts access to network resources;
sending a token request to the user device via the first network connection, wherein sending the token request comprises executing code to redirect a browser on the user device to a webpage;
receiving a token from the webpage and via the first network connection in response to sending the token request to the user device, wherein the token is a unique value that is associated with the first user;
identifying a second user identity of the first user obtained using the token;
determining that the first user identity of the first user matches the second user identity of the first user; and
establishing a second network connection for the user device, wherein the second network connection enables the user device to access the network resources that were restricted by the first network connection, wherein identifying the second user identity of the first user obtained using the token comprises:
sending the token to an identity provider device that is configured to validate the token; and
receiving the second user identity from the identity provider device after validating the token.

7. The integrated multifactor authentication method of claim 6, further comprising:
identifying a device configuration that identifies a hardware configuration and a software configuration for the user device;
comparing the device configuration to a set of device configuration requirements; and
determining the user device satisfies the set of device configuration requirements based on the device configuration before establishing the second network connection.

8. The integrated multifactor authentication method of claim 6, wherein the device authentication credentials comprises a device certificate that identifies the user device.

9. The integrated multifactor authentication method of claim 6, further comprising:
identifying user permission settings for the first user; and
determining the first user is authorized to access the network based on the user permission settings before establishing the second network connection.

10. The integrated multifactor authentication method of claim 6, wherein the second network connection is a virtual private network (VPN) connection with the network.

11. A non-transitory computer-readable medium storing instructions that when executed by a processor cause the processor to:
receive a connection request from a user device, wherein the connection request comprises device authentication credentials for the user device;
identify a device profile for the user device that corresponds with the device authentication credentials;

determine that the user device passes authentication in response to identifying the device profile;
receive user credentials for a first user of the user device;
identify a first user identity of the first user based on the user credentials for the first user;
establish a first network connection with the user device, wherein the first network restricts access to network resources;
send a token request to the user device via the first network connection, wherein the token request is sent by executing code to redirect a browser on the user device to a webpage;
receive a token from the webpage and via the first network connection in response to sending the token request to the user device, wherein the token is a unique value that is associated with the first user;
identify a second user identity of the first user obtained using the token;
determine that the first user identity of the first user matches the second user identity of the first user; and
establish a second network connection for the user device, wherein the second network connection enables the user device to access the network resources that were restricted by the first network connection, wherein identifying the second user identity of the first user obtained using the token comprises:
sending the token to an identity provider device that is configured to validate the token; and
receiving the second user identity from the identity provider device after validating the token.

12. The non-transitory computer-readable medium of claim 11, wherein the instructions further cause the processor to:
identify a device configuration that identifies a hardware configuration and a software configuration for the user device;
compare the device configuration to a set of device configuration requirements; and
determine the user device satisfies the set of device configuration requirements based on the device configuration before establishing the second network connection.

13. The non-transitory computer-readable medium of claim 11, wherein the device authentication credentials comprises a device certificate that identifies the user device.

14. The non-transitory computer-readable medium of claim 11, further comprising instructions that when executed by the processor cause the processor to:
identify user permission settings for the first user; and
determine the first user is authorized to access the network based on the user permission settings before establishing the second network connection.

* * * * *